(12) United States Patent
Horie

(10) Patent No.: US 12,508,755 B2
(45) Date of Patent: Dec. 30, 2025

(54) INJECTION MOLDING SYSTEM AND METHOD FOR CONTROLLING INJECTION MOLDING SYSTEM

(71) Applicant: SEIKO EPSON CORPORATION, Tokyo (JP)

(72) Inventor: Seijun Horie, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 70 days.

(21) Appl. No.: 18/585,290

(22) Filed: Feb. 23, 2024

(65) Prior Publication Data
US 2024/0286330 A1  Aug. 29, 2024

(30) Foreign Application Priority Data

Feb. 24, 2023 (JP) ................. 2023-027114

(51) Int. Cl.
*B29C 45/16* (2006.01)
*B29C 45/17* (2006.01)
*B29C 45/42* (2006.01)
*B29C 45/76* (2006.01)

(52) U.S. Cl.
CPC ...... *B29C 45/1769* (2013.01); *B29C 45/7686* (2013.01)

(58) Field of Classification Search
CPC .............. B29C 45/1615; B29C 45/162; B29C 45/1621; B29C 45/42; B29C 2045/4275; B29C 45/14008; B29C 2045/14049
See application file for complete search history.

(56) References Cited

U.S. PATENT DOCUMENTS

| | | | | |
|---|---|---|---|---|
| 4,620,831 A * | 11/1986 | Poncet | ................. | B25J 9/1045 |
| | | | | 901/17 |
| 6,054,075 A | 4/2000 | Inaba et al. | | |
| 6,322,733 B1 * | 11/2001 | Herbst | ................. | B29C 45/42 |
| | | | | 425/444 |
| 2002/0079619 A1 * | 6/2002 | Herbst | ................. | B29C 45/73 |
| | | | | 264/328.8 |
| 2002/0086085 A1 * | 7/2002 | Takayama | ................. | B25J 18/04 |
| | | | | 425/444 |

(Continued)

FOREIGN PATENT DOCUMENTS

| | | | | |
|---|---|---|---|---|
| DE | 102006019007 B3 * | 6/2007 | .......... | B29C 43/203 |
| JP | H09-201849 A | 8/1997 | | |
| JP | 2009-073151 A | 4/2009 | | |

*Primary Examiner* — Matthew J Daniels
(74) *Attorney, Agent, or Firm* — Harness, Dickey & Pierce, P.L.C.

(57) ABSTRACT

As viewed in the vertical direction, in the injection molding system, a first distance, which is a distance between a first joint and a first placement section, a second distance, which is a distance between the first joint and a second placement section, and a third distance, which is a distance between the first joint and a robot wall section, are smaller than a fourth distance, which is a distance between the first joint and a tip end of a second arm when a first arm and the second arm are on a co-linear straight line and in an angular range from one of the first placement section and the second placement section to the robot wall section centered on the first joint, the distance between the first joint and at least a part of a wall section is larger than the fourth distance.

8 Claims, 8 Drawing Sheets

(56) References Cited

U.S. PATENT DOCUMENTS

| | | | |
|---|---|---|---|
| 2003/0055525 A1* | 3/2003 | Graham | G05B 19/41825 |
| | | | 700/200 |
| 2003/0152661 A1* | 8/2003 | Yu | B25J 9/1045 |
| | | | 425/436 RM |
| 2004/0094866 A1* | 5/2004 | Boucherie | B29C 45/0441 |
| | | | 264/328.8 |
| 2005/0196483 A1* | 9/2005 | Kinoshita | B29C 45/42 |
| | | | 425/444 |
| 2005/0202116 A1* | 9/2005 | Kinoshita | B29C 45/42 |
| | | | 425/444 |
| 2009/0302490 A1* | 12/2009 | Lee | B29C 45/1671 |
| | | | 425/317 |
| 2013/0307183 A1* | 11/2013 | Rohlje | B29C 45/1628 |
| | | | 425/518 |
| 2014/0077410 A1* | 3/2014 | Takatsugi | B29C 45/162 |
| | | | 264/161 |
| 2016/0332348 A1* | 11/2016 | Bae | B29D 11/00009 |
| 2021/0008769 A1* | 1/2021 | Tsuchiya | B29C 45/14065 |
| 2024/0149435 A1* | 5/2024 | Nakanishi | B25J 9/042 |

* cited by examiner

INJECTION MOLDING SYSTEM AND METHOD FOR CONTROLLING INJECTION MOLDING SYSTEM

The present application is based on, and claims priority from JP Application Serial Number 2023-027114, filed Feb. 24, 2023, the disclosure of which is hereby incorporated by reference herein in its entirety.

BACKGROUND

1. Technical Field

The present disclosure relates to an injection molding system and a method for controlling the injection molding system.

2. Related Art

JP-A-2009-073151 discloses a method for manufacturing a two-color molded article by molding a two-color molded article using a first injection molding machine and a second injection molding machine in which a movable molding die and a fixed molding die of a metal mold are aligned on the right and left sides, and an industrial robot provided with a first shaft to a sixth shaft. The industrial robot moves a resin-molded article molded by the first injection molding machine to the second injection molding machine. Then, in the second injection molding machine, injection molding is performed on the resin-molded article, thereby producing a two-color molded article.

Generally, a vertical molding machine and a horizontal molding machine are known as two types of injection molding machines. A vertical molding machine has a structure in which an injection unit that causes material to flow and a mold clamping mechanism for opening and closing the metal mold are aligned in a vertical direction. A horizontal molding machine has a structure in which the injection unit and the mold clamping mechanism are aligned horizontally. Therefore, when an injection unit and a mold clamping mechanism that have the same size as those of the horizontal molding machine are used in the vertical molding machine, the area occupied by the injection molding machine in the horizontal plane is smaller than that of the horizontal molding machine. In general, it is known that the area of a horizontal articulated robot is smaller than that of a vertical articulated robot.

In order to improve productivity per unit area, an injection molding machine in which a vertical molding machine and a horizontal articulated robot are combined is considered. However, since vertical molding machines have a height in the vertical direction as compared with horizontal molding machines, there is a possibility that the horizontal articulated robot interferes with the vertical injection molding machine, a housing surrounding the vertical injection molding machine, or the like. On the other hand, for example, when the vertical molding machine and the horizontal articulated robot are disposed apart from each other so as to avoid interference, the size of the injection molding system including the vertical molding machine and the horizontal articulated robot increases. Therefore, there has been room for improvement in the injection molding machine in which the vertical molding machine and the horizontal articulated robot are combined.

SUMMARY

According to a first aspect of the present disclosure, an injection molding system is provided.

This injection molding system includes a first injection molding section that has a wall section and that is configured to mold a workpiece; a second injection molding section that has a wall section, that is disposed aligned in a horizontal direction with the first injection molding section, and that is configured to mold a molded article by using the workpiece; a robot that is disposed between the first injection molding section and the second injection molding section and that is configured to carry the workpiece from the first injection molding section to the second injection molding section; and a robot wall section disposed between the first injection molding section and the second injection molding section and extending in the direction in which the first injection molding section and the second injection molding section are aligned, wherein the first injection molding section includes a first placement section on which the workpiece is placed, the second injection molding section includes a second placement section on which the workpiece used for molding is placed, the robot includes a base, a first arm coupled to the base via a first joint, and a second arm coupled to the base via a second joint with a rotation axis parallel to a rotation axis of the first joint, as viewed in a vertical direction, a first distance, which is the distance between the first joint and the first placement section, a second distance, which is the distance between the first joint and the second placement section, and a third distance, which is the distance between the first joint and the robot wall section, are smaller than a fourth distance, which is the distance between the first joint and a tip end of the second arm when the first arm and the second arm are on a co-linear straight line, and in an angular range centered on the first joint from one of the first placement section and the second placement section to the robot wall section, the distance between the first joint and at least a part of the wall section is larger than the fourth distance.

According to a second aspect of the present disclosure, there is provided, a control method for an injection molding system having a robot including a first arm coupled to a base via a first joint and a second arm coupled to the base via a second joint having a rotation axis parallel to a rotation axis of the first joint, as viewed in a vertical direction.

This control method for the injection molding system includes a first injection molding section injection-molding a workpiece; the robot holding the workpiece placed in the first placement section in a state in which an angle formed by the first arm and the second arm, which is an angle on the first injection molding section side with respect to the second injection molding section, is less than 180°, taking a posture in which the first arm and the second arm are arranged on a co-linear straight line, and transporting the workpiece to the second injection molding section in a state in which the angle is 180° or more; and the second injection molding section molding a molded article using the workpiece.

DESCRIPTION OF EMBODIMENTS

A. Present Embodiment

A1. Configuration of Present Embodiment

Figure 1:
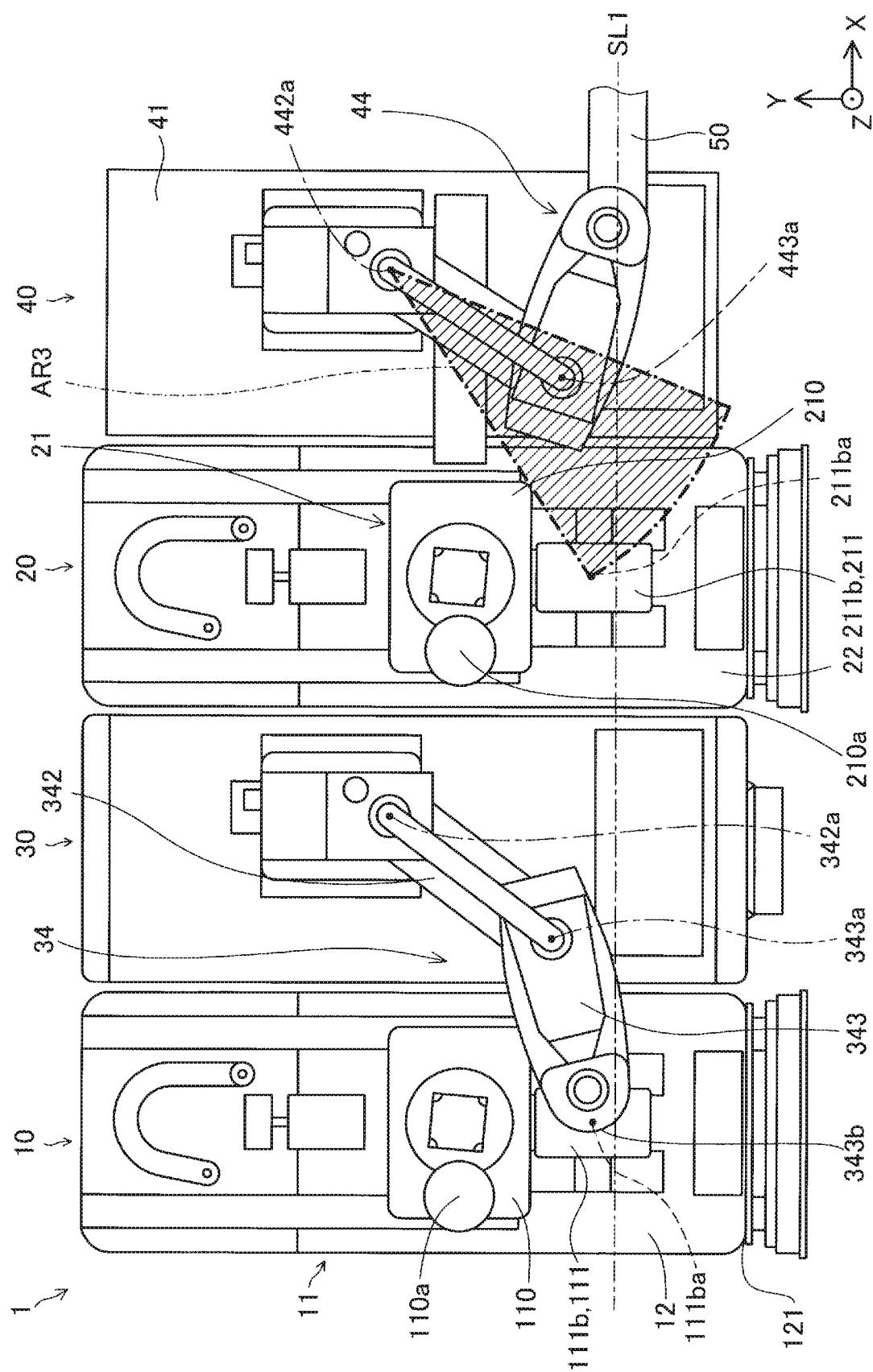
FIG. 1 is a diagram of an injection molding system of a present embodiment as viewed from above in a vertical direction.
Figure 2:
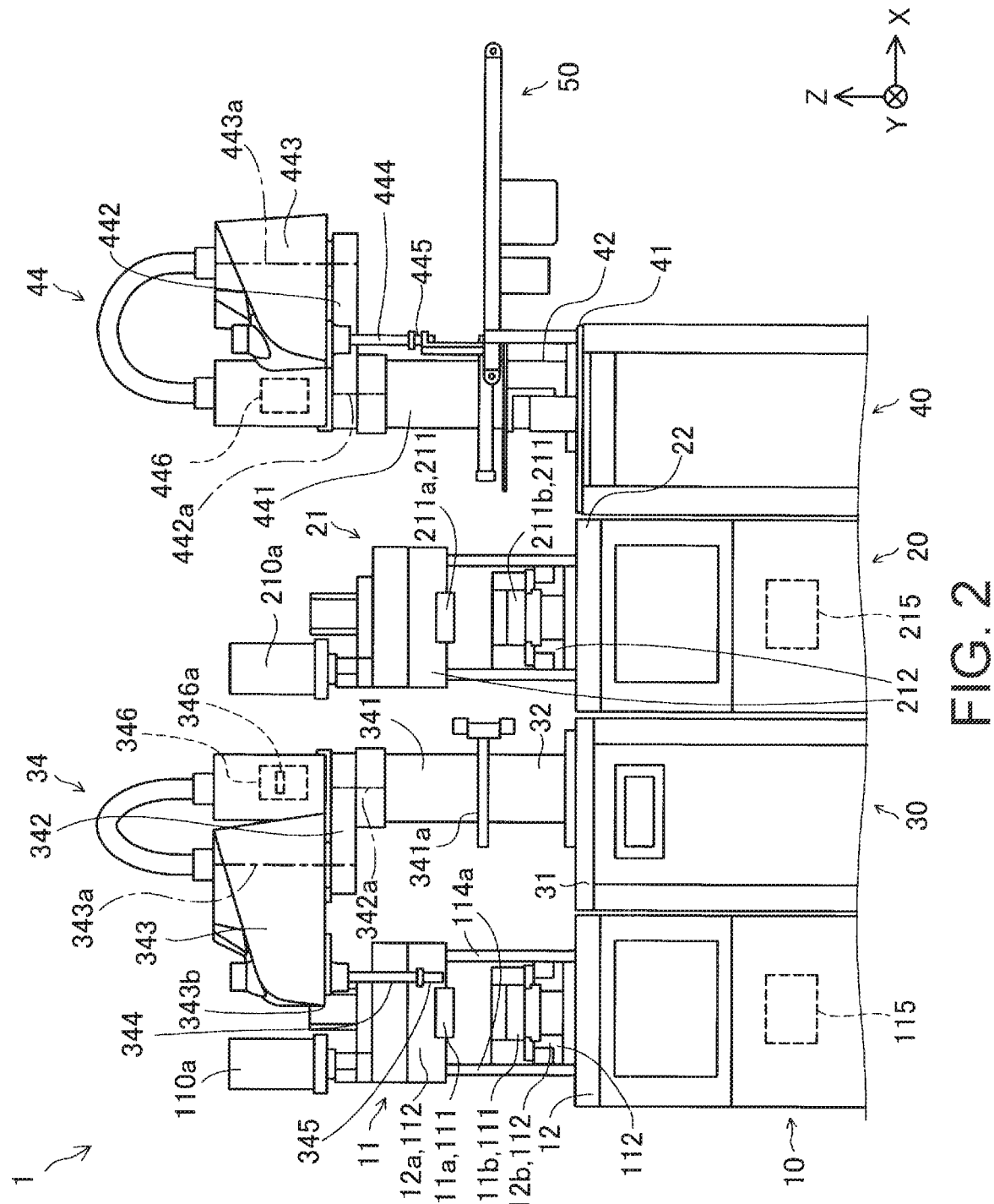
FIG. 2 is a diagram of the injection molding system of the present embodiment as viewed in a horizontal direction.

FIG. 1 is a diagram of an injection molding system 1 of a present embodiment as viewed from the upper side in a vertical direction. FIG. 2 is a diagram of the injection molding system 1 of the present embodiment as viewed in a horizontal direction. In FIG. 1, arrows along the X-, Y-, and Z-axis directions orthogonal to each other are shown. The X, Y, and Z directions are directions along the X-axis, the Y-axis, and the Z-axis, which are three spatial axes orthogonal to each other, and each direction includes both the direction along one side of the X-axis, the Y-axis, and the Z-axis and the opposite side. The X-axis and the Y-axis are axes along a horizontal plane, and the Z-axis is an axis along a vertical line. The −Z-axis direction is a downward direction of the vertical direction, and the +Z-axis direction is an upward direction of the vertical direction. The −Z-axis direction is also referred to as "down", and the +Z-axis direction is also referred to as "up". In other figures, arrows along the X-, Y-, and Z-axis directions are shown as appropriate. The X-, Y-, and Z-axis directions in FIG. 1 and the X-, Y-, and Z-axis directions in other figures indicate the same direction.

As shown in FIGS. 1 and 2, the injection molding system 1 includes a first housing 10, a second housing 20, a third housing 30, a fourth housing 40, and a transport device 50. The first housing 10, the third housing 30, the second housing 20, and the fourth housing 40 are aligned in this order in the +X direction. As viewed in the vertical direction, the third housing 30 is disposed between the first housing 10 and the second housing 20, and the second housing 20 is disposed between the third housing 30 and the fourth housing 40. The first housing 10, the second housing 20, the third housing 30, and the fourth housing 40 include wheels at each corner of the bottom surface thereof, and are configured to be freely movable. The adjacent housings are attachably and detachably connected to each other.

The first housing 10 includes a first injection molding section 11, a first injection base 12, and a first wall section 13 (not shown). The first injection molding section 11 molds a workpiece before being used for insert molding. The first injection molding section 11 includes a first injection unit 110, a first molding die 111, a first support section 112, a first position changing section 113 (not shown), a first molding die clamping section 114 (not shown), and a first injection control section 115.

The first injection unit 110 molds the workpiece WK by injecting material of the workpiece WK toward the first molding die 111. The first injection unit 110 includes a first material storage section 110a. The first material storage section 110a stores the material of the workpiece WK. As shown in FIG. 2, in the present embodiment, the first material storage section 110a is a vertically uppermost section of the first injection molding section 11 as viewed in the horizontal direction.

The first molding die 111 is a section in which the material of the workpiece WK injected from the first injection unit 110 is molded. The first molding die 111 is installed in the first injection molding section 11 by being supported by the first support section 112. The first molding die 111 includes a first upper molding die 111a and a first lower molding die 111b. The first upper molding die 111a and the first lower molding die 111b define a cavity which is a space corresponding to the shape of the workpiece WK. More specifically, the lower surface of the first upper molding die 111a and the upper surface of the first lower molding die 111b are provided with recesses and projections for defining the cavity, and when the first upper molding die 111a and the first lower molding die 111b are clamped, a cavity having a shape corresponding to the recesses and projections is defined between the first upper molding die 111a and the first lower molding die 111b. Although not shown in the figure, the molded workpiece WK is placed on the first lower molding die 111b. In the present embodiment, the center of the portion where the workpiece WK is placed in the first lower molding die 111b that has been moved to point B (to be described later) by the first position changing section 113 (to be described later) is referred to as a "first placement section 111ba". The first molding die 111 may be made of metal, resin, or ceramic. The first molding die 111 made of metal is also referred to as a metal mold.

The first support section 112 supports the first molding die 111. The first support section 112 includes an upper molding die support section 112a and a lower molding die support section 112b. The upper molding die support section 112a supports the first upper molding die 111a. The upper molding die support section 112a is fixed to a lower portion of the first injection unit 110, and clamps and fixes the first upper molding die 111a in the X direction. The lower molding die support section 112b is provided below the upper molding die support section 112a, and clamps and fixes the first lower molding die 111b in the X direction.

Figure 3:
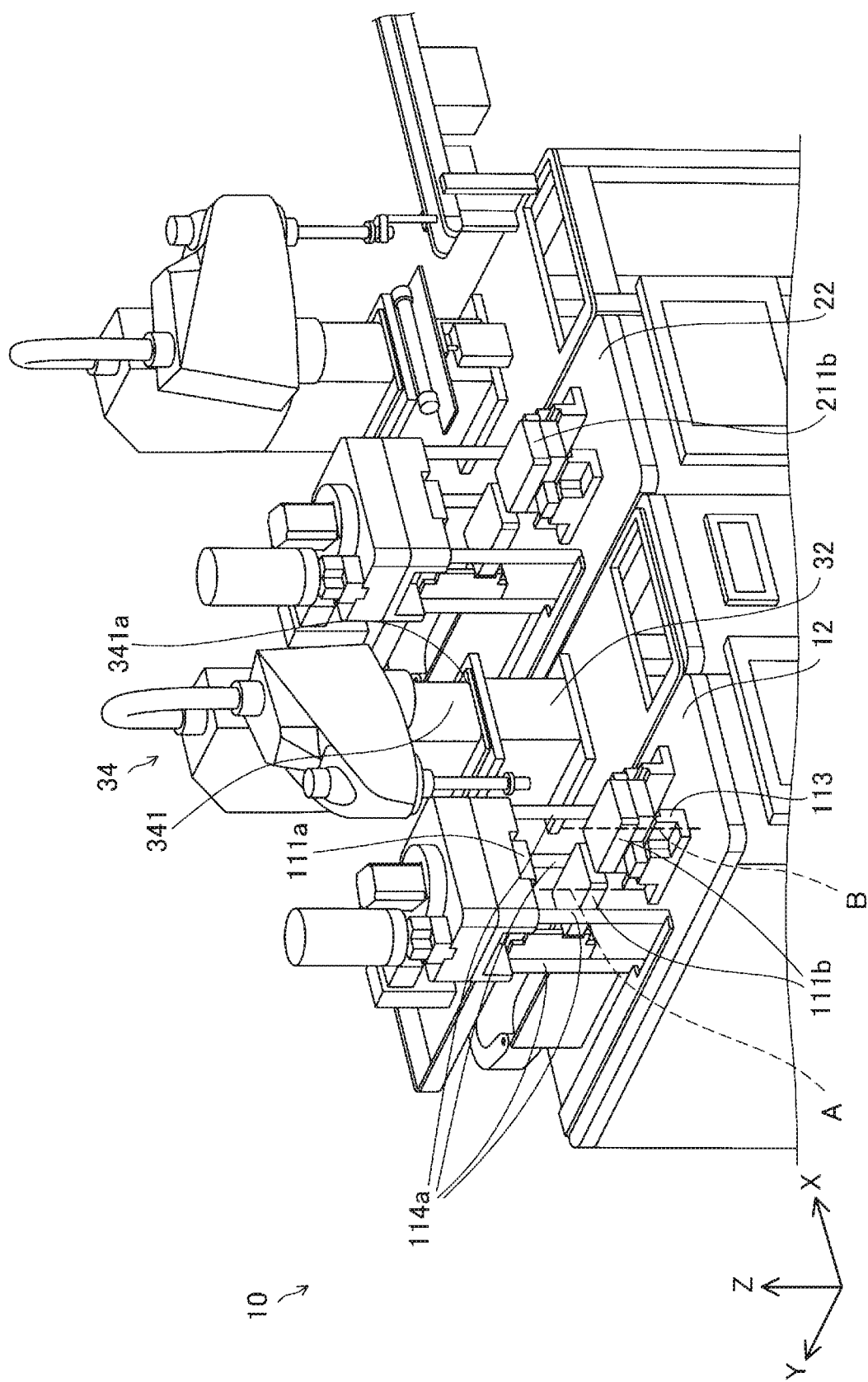
FIG. 3 is a diagram for explaining the movement of a first lower molding die.

FIG. 3 is a diagram for explaining the movement of the first lower molding die 111b. FIG. 3 shows the first lower molding die 111b disposed at different points A and B. The first position changing section 113 moves the first lower molding die 111b in the Y-axis direction. Although not shown, the first position changing section 113 is provided on the lower side of the lower molding die support section 112b and is configured to be able to linearly move the lower molding die support section 112b in the Y-axis direction. Point A of the first lower molding die 111b indicated below the first upper molding die 111a represents the position of the first lower molding die 111b immediately after the workpiece WK is molded. By the first position changing section 113 moving the first lower molding die 111b to the −Y side, the first lower molding die 111b positioned at point A is moved to point B. Thereafter, the workpiece WK disposed on the first lower molding die 111b is pushed up from the first lower molding die 111b by a mechanism (not shown) for removing the workpiece WK from the first lower molding die 111b, and by this is in a state of being disposed on the first placement section 111ba. A first robot 34 can access the workpiece WK disposed on the first placement section 111ba that is positioned at point B.

The first molding die clamping section 114 is configured to be able to perform molding die clamping and molding die opening of the first molding die 111 by moving the first injection unit 110 and the first upper molding die 111a along the vertical direction by drive of a motor (not shown). An injection molding machine such as the first injection molding section 11, which performs molding die opening and molding die clamping in the vertical direction, may be referred to as a vertical injection molding device or a vertical injection molding machine. As shown in FIG. 3, the first molding die clamping section 114 includes struts 114a.

The struts 114a fixes the first injection unit 110. The struts 114a are composed of four struts extending in the Z direction. The struts 114a are provided so as to penetrate the first injection base 12 in the Z direction from inside the first housing 10.

The first injection control section 115 shown in FIG. 2 is configured by a computer including one or more processors, a main storage device, and an input/output interface that performs input and output with the outside. When the processor reads the program into the main storage device and executes it, the first injection control section 115 controls the first injection unit 110 and the first molding die clamping section 114 to manufacture the workpiece WK.

In the first injection base 12 shown in FIG. 2, the first injection unit 110 is mounted on the upper side, and the first molding die clamping section 114 is disposed on the lower side. A part of the first molding die clamping section 114 is provided so as to penetrate the first injection base 12 in the Z-axis direction. An upper end of a part of the first molding die clamping section 114 is coupled to the first injection unit 110. The first injection unit 110 and the first molding die 111 are disposed on the upper side of the first injection base 12. The first wall section 13 is disposed at an end portion 121 on the −Y side of the first injection base 12 shown in FIG. 1 and extends in the X-axis direction and the Z-axis direction.

The second housing 20 shown in FIG. 1 includes a second injection molding section 21, a second injection base 22, and a second wall section 23 (not shown). The dimensions of the second housing 20 in the X-axis, Y-axis, and Z-axis directions are the same as the dimensions of the first housing 10. The second injection molding section 21 molds a molded article by the insert molding using the workpiece WK. Insert molding is one method of molding a molded article by injection molding and indicates a method of molding an integrated product in which the workpiece WK and the injected molding material are integrated into a molded article by injecting molding material into the cavity of the molding die in which the workpiece WK is placed.

The second injection molding section 21 shown in FIGS. 1 and 2 has the same configuration as that of the first injection molding section 11. Below, detailed description will be omitted for configuration of the second injection molding section 21 that is similar to that of the first injection molding section 11.

Since the first housing 10 and the second housing 20 are disposed aligned in the X-axis direction as described above, the second injection molding section 21 is disposed aligned with the first injection molding section 11 in the X-axis direction. The second injection molding section 21 includes a second injection unit 210, a second molding die 211, a second support section 212, a second position changing section 213 (not shown), a second molding die clamping section 214 (not shown), and a second injection control section 215. The second injection unit 210 includes a second material storage section 210a.

In the second injection molding section 21, the workpiece WK to be used for insert molding is placed on a second lower molding die 211b of the second molding die 211 by the first robot 34, and by this the workpiece WK is placed in the cavity of the second molding die 211. In the present embodiment, the center of the portion of the second lower molding die 211b disposed on the −Y side, where the workpiece WK is placed by the first robot 34, is referred to as a "second placement section 211ba". The second injection control section 215 of the second injection molding 21 is electrically connected to the first injection control section 115 of the first injection molding section 11, and they can transmit and receive signals to and from each other.

The second injection base 22 has the same configuration as the first injection base 12. The second injection unit 210 and the second molding die 211 are disposed on the upper side of the second injection base 22. The second wall section 23 has the same configuration as the first wall section 13.

The first robot 34 is disposed on the third housing 30. The third housing 30 is disposed between the first housing 10 and the second housing 20 in the X-axis direction, which is the direction in which the first injection molding section 11 and the second injection molding section 21 are aligned. That is, the third housing 30 is disposed between the first injection molding section 11 and the second injection molding section 21 in the X-axis direction. The third housing 30 has the same X-axis, the Y-axis, and Z-axis dimensions as the first housing 10 and the second housing 20.

Figure 4:
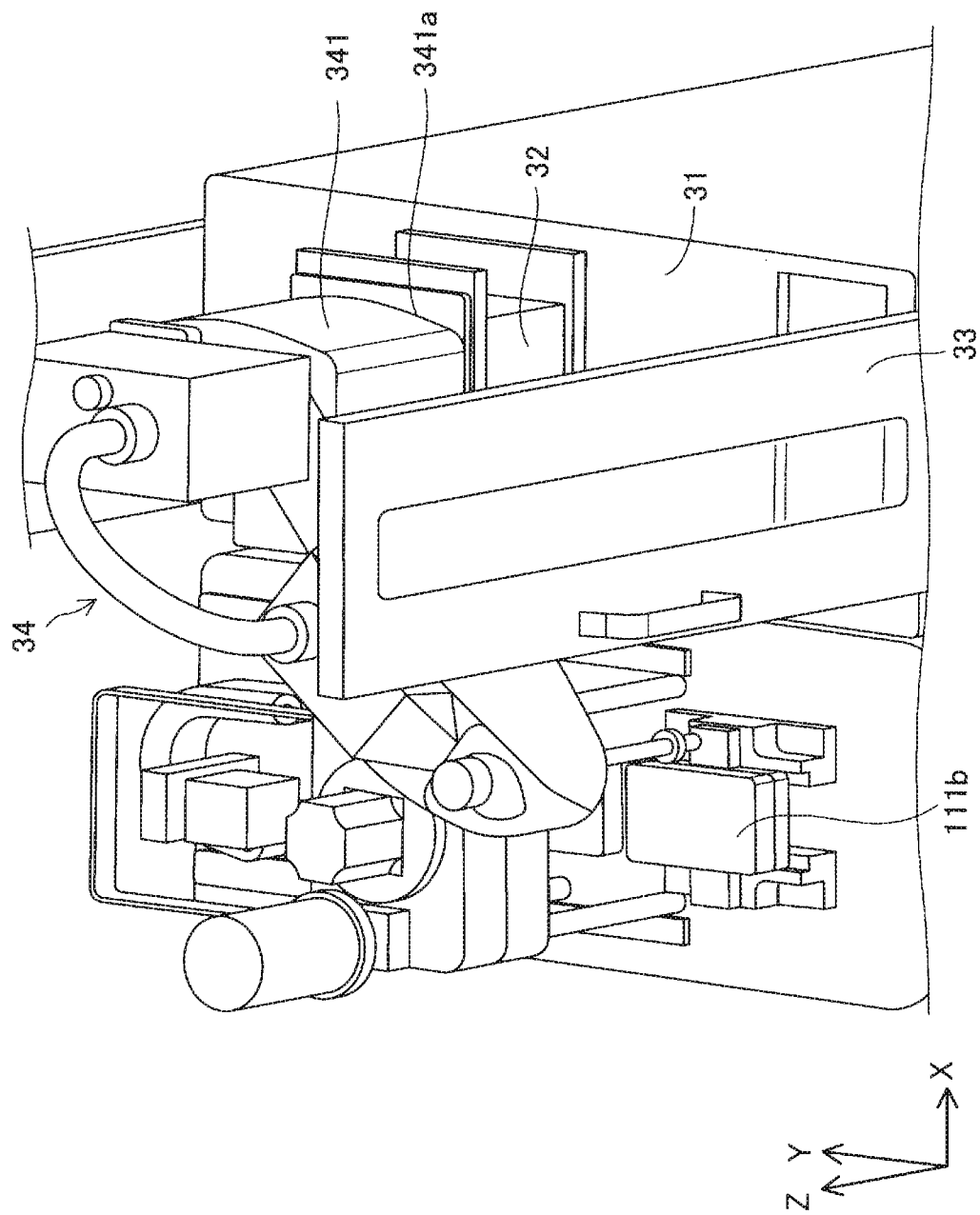
FIG. 4 is a diagram for explaining a third wall section.

FIG. 4 is a diagram for explaining a third wall section 33. In FIG. 4, the illustration of the second housing 20 is simplified. As shown in FIGS. 2 and 4, the third housing 30 includes a first mounting section 31, a first pedestal 32, the third wall section 33, and the first robot 34. The first mounting section 31 disposes the first pedestal 32. The first pedestal 32 disposes the first robot 34. As shown in FIG. 4, the third wall section 33 is disposed at an end portion of the third housing 30 closest to the −Y side and extends in the X-axis direction and the Z-axis direction. As viewed in the vertical direction, the third wall section 33 is positioned on the −Y side, which is a side opposite than a first joint 342a of the first robot 34 (to be described later) with respect to the first placement section 111ba and the second placement section 211ba.

The first robot 34 carries the workpiece WK from the first injection molding section 11 to the second injection molding section 21. The first robot 34 is constituted by the horizontal articulated robot. In general, the horizontal articulated robot has fewer joints than a vertical articulated robot. Therefore, the horizontal articulated robot is lighter and smaller than the vertical articulated robot, and it is easy for a user to teach an operation by using a teaching device (not shown). In addition, in many cases, it is generally difficult to overlap the arms of the vertical articulated robot as viewed in the vertical direction, since the arms spread in the vertical direction or the horizontal direction, it is considered that the vertical articulated robot easily interferes with surrounding objects. In addition, by the arm of the vertical articulated robot is lengthened to increase the movable range, a space that cannot be used is generated below the arm. For this reason, as compared with the vertical articulated robot, the horizontal articulated robot is easily disposed in a place where a space in the horizontal direction is limited.

As shown in FIG. 2, the first robot 34 includes a first base 341, a first arm 342, a second arm 343, a first shaft 344, a first holding section 345, and a first robot control section 346.

The first base 341 supports components constituting the first robot 34. In the present embodiment, an end portion 341a on the lowermost side of the first base 341 in the vertical direction is positioned on the upper side of the first injection base 12 and the second injection base 22 in the vertical direction. In the present embodiment, the dimension in the vertical direction of the first robot 34 excluding a duct is smaller than the dimension in the vertical direction of the configuration disposed to the upper side of the first injection base 12 in the first injection molding section 11, and smaller than the dimension of the configuration disposed to the upper side of the second injection base 22 in the second injection molding section 21. Therefore, when the aspect in which the first robot 34 is disposed directly on the first mounting section 31, since a vertical molding machine has a higher height in the vertical direction as compared with a horizontal molding machine, it is difficult for the first robot 34 disposed between the first injection molding section 11 and the second injection molding section 21, which are the two vertical molding machines, to carry the molded article using the space above the two injection molding machines, and when the first robot 34 carries the workpiece WK from the first lower molding die 111b to the second lower molding die 211b, the first robot 34 may contact the first injection molding section 11 and the second injection molding section 21.

In the present embodiment, by the first base 341 is disposed on the first pedestal 32, the lower end portion 341a of the first base 341 is positioned above the first injection base 12 and the second injection base 22. The height of the first pedestal 32 is set such that the end portion on the lowermost side of the second arm 343 does not contact a part of the first injection unit 110 when the first robot 34 is disposed on the first pedestal 32. The part of the first injection unit 110 is a portion of the first injection unit 110 that overlaps the second arm 343 while it is being operated, as viewed in the vertical direction. Thus, it is possible to prevent the second arm 343 of the first robot 34 from contacting the first injection molding section 11 and the second injection molding section 21 when the first robot 34 moves in the horizontal direction.

As shown in FIG. 2, the first arm 342 is coupled to the first base 341 via the first joint 342a. In FIG. 2, the first joint 342a is represented by single dot chain line. The first joint 342a has a rotation axis in a direction parallel to the Z-axis. As shown in FIG. 1, as viewed in the vertical direction, the first placement section 111ba and the second placement section 211ba are positioned on the −Y side, which is the same side with respect to the first joint 342a in the Y-axis direction. The second arm 343 is coupled to the first base 341 by being coupled to the first arm 342 via the second joints 343a. In FIG. 2, the second joint 343a is indicated by single dot chain line. The second arm 343 has a rotation axis parallel to the rotation axis of the first joint 342a.

The first shaft 344 is coupled to the second arm 343 and extends from the second arm 343 in the −Z direction. In the present embodiment, the second arm 343 has the same height in the vertical direction as the first material storage section 110a and as the second material storage section 210a as viewed in the horizontal direction. The same height in the vertical direction means that a horizontally parallel straight line passing through the first material storage section 110a passes through the second arm 343 and that a horizontally parallel straight line passing through the second material storage section 210a passes through the second arm 343.

The first holding section 345 holds the workpiece WK. The first holding section 345 is coupled to an end portion of the first shaft 344 on the −Z side. Since the first shaft 344 extends in the −Z direction, even when the first robot 34 is disposed on the first pedestal 32 as described above, it is possible for the first holding section 345 to hold the workpiece WK placed on the first placement section 111ba and to place the workpiece WK on the second placement section 211ba.

Figure 5:
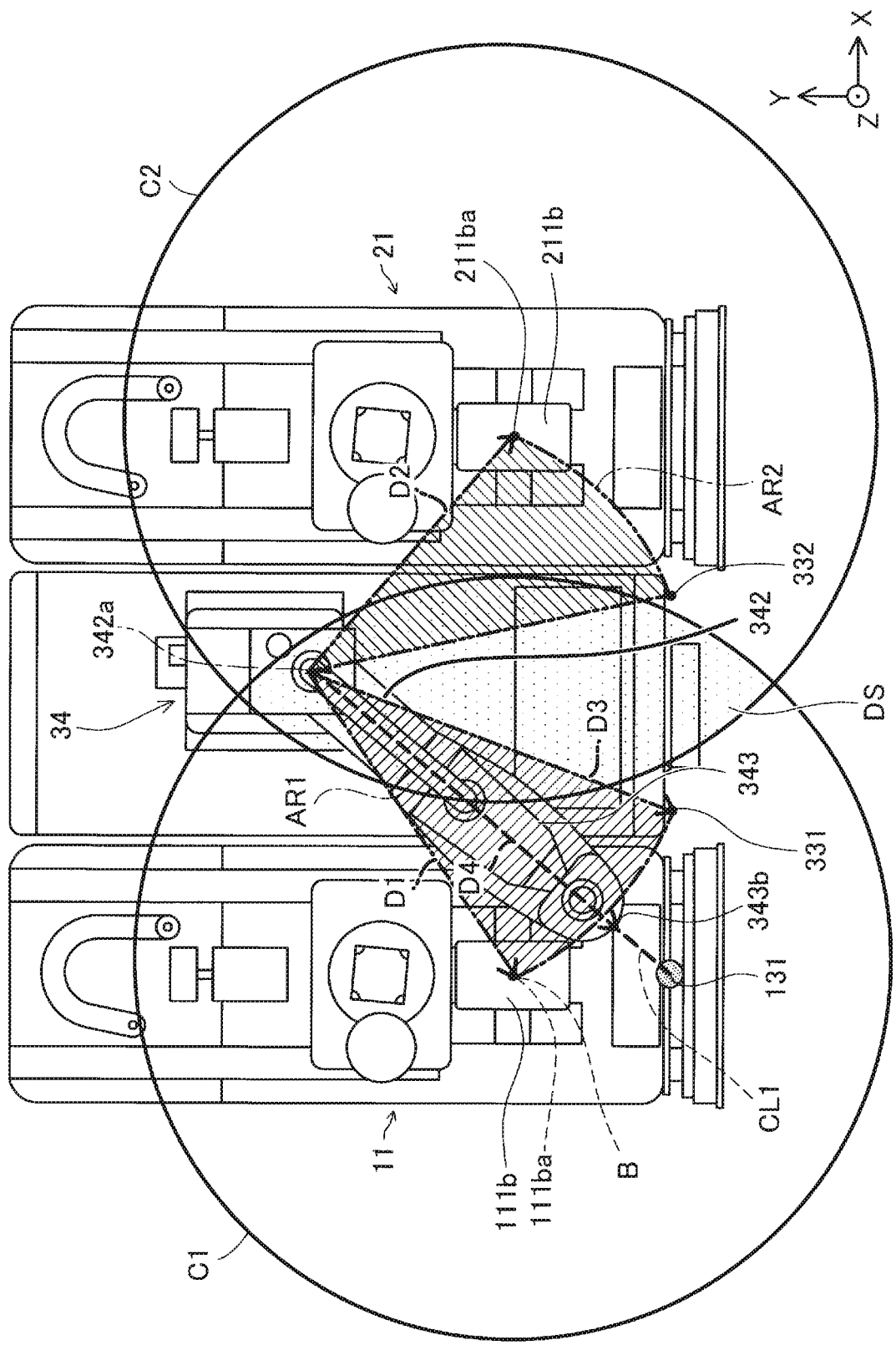
FIG. 5 is a diagram for explaining a state in which a first arm and a second arm are aligned on a co-linear straight line.

FIG. 5 is a view for explaining a state in which the first arm 342 and the second arm 343 are aligned on a co-linear straight line CL1. In FIG. 5, the fourth housing 40, a second robot 44, and the transport device 50 are omitted. The same applies to FIGS. 6 and 7. Here, the positional relationship between the first robot 34, and the first injection molding section 11 and the second injection molding section 21 will be described with reference to FIG. 5.

As viewed in the vertical direction, the distance between the first joint 342a and the first placement section 111ba is expressed as a first distance D1. In the present embodiment, the distance between the first joint 342a and the first placement section 111ba refers to the distance between the first placement section 111ba of the first lower molding die 111b moved in the −Y direction by the first position changing section 113 and the first joint 342a. Note that the term "distance" as used herein refers to a linear distance between two points parallel to a plane including the Y-axis and the X-axis, and the same applies to distances described below.

As viewed in the vertical direction, the distance between the first joint 342a and the second placement section 211ba is expressed as a second distance D2. In the present embodiment, the distance between the first joint 342a and the second placement section 211ba refers to the distance between the second placement section 211ba of the second lower molding die 211b moved in the −Y direction by the second position changing section 213 and the first joint 342a. As viewed in the vertical direction, the largest distance between the first joint 342a and the third wall section 33 is expressed to as a third distance D3. The distance between the first joint 342a and a tip end 343b of the second arm 343 as viewed in the vertical direction is expressed as a fourth distance D4. The tip end 343b of the second arm 343 refers to an end portion on the side opposite to the end portion on the side close to the first arm 342. The first distance D1, the second distance D2, and the third distance D3 are smaller than the fourth distance D4.

The first joint 342a is disposed at a position where the distance between the first joint 342a and either the first placement section 111ba and the second placement section 211ba is larger than the distance between the first joint 342a and the other. In the present embodiment, the first joint 342a is disposed at a position where the distance from the first joint 342a to the first placement section 111ba is larger than the distance from the first joint 342a to the second placement section 211ba. As shown in FIG. 5, the first distance D1 between the first joint 342a and the first placement section 111ba is larger than the second distance D2 between the first joint 342a and the second placement section 211ba.

As shown in FIG. 5, a circle having a radius of the fourth distance D4 from the first placement section 111ba is expressed to as a first circle C1. Similarly, a circle having a radius of the fourth distance D4 from the second placement section 211ba is expressed to as a second circle C2. The first joint 342a is disposed in the overlapping portion DS where the first circle C1 and the second circle C2 overlap each other, and also at a position where the distance from the third wall section 33 to the first joint 342a is larger than the distance from the first joint 342a to the second joint 343a. Thus, the first arm 342 and the second arm 343 can be aligned on the co-linear straight line in a first angular range AR1, which is an angular range from the first placement section 111ba to the third wall section 33, centered on the first joint 342a.

The first arm 342 and the second arm 343 are aligned on a co-linear straight line means that a line that connects the second joint 342a and the tip end 343b of the second arm 343 and that is parallel to the plane including the Y-axis and the X-axis is present in an extension of a line connecting the first joint 342a and the second joint 343a and parallel to the plane including the Y-axis and the X-axis as viewed in the vertical direction. Further, in the present embodiment, as viewed in the vertical direction, the first arm 342 and the second arm 343 are aligned on a straight line connecting the first joint 342a and a center 131 of the first wall section 13 in the X-axis direction. In FIG. 5, the center 131 of the first wall section 13 is shown for convenience. Note that, as viewed in the vertical direction, the first arm 342 and the second arm 343 may be aligned on a co-linear straight line connecting the first joint 342a and the end portion of the first wall section 13 furthest to the +X side, and the first arm 342 and the second arm 343 may be aligned on a co-linear straight line connecting the first joint 342a and the end portion of the first wall section 13 furthest to the −X side.

In the present embodiment, the first angular range AR1 is an angular range, as viewed in the vertical direction and centered on the first joint 342a, from the first placement section 111ba to an end portion 331 of the third wall section 33 in the −X direction. In FIG. 5, the end portion 331 on the −X side of the third wall section 33 is shown for convenience. In FIG. 5, a part of the first angular range AR1 is hatched.

Conversely, the first arm 342 and the second arm 343 cannot be aligned on the co-linear straight line in a second angular range AR2, which is an angular range from the second placement section 211ba, which is the other side of the first placement section 111ba, to the third wall section 33, centered on the first joint 342a. In the present embodiment, the second angular range AR2 refers to an angular range, as viewed in the vertical direction and centered on the first joint 342a, from the second placement section 211ba to an end portion 332 of the third wall section 33 in the +X direction. In FIG. 5, the end portion 332 of the third wall section 33 in the +X direction is shown for convenience. In FIG. 5, the second angular range AR2 is hatched.

As described above, since the third distance D3, which is the largest distance between the first joint 342a and the third wall section 33, is smaller than the fourth distance D4, as viewed in the vertical direction, the second arm 343 and the third wall section 33 may come into contact with each other when the first arm 342 and the second arm 343 are aligned on the co-linear straight line. For example, by the dimension of the third housing 30 in the X-axis direction being increased and the first arm 342 and the second arm 343 being aligned on the co-linear straight line at a position overlapping with the first mounting section 31 as viewed from the vertical direction, the second arm 343 may not be able to access the first placement section 111ba and the second placement section 211ba in an aspect in which the second arm 343 and the third wall section 33 do not contact each other. Further, for example, if the first robot 34 were not disposed between the first injection molding section 11 and the second injection molding section 21, but were disposed so as to face the first injection molding section 11 and the second injection molding section 21, then the dimension of the injection molding system 1 in the Y-axis direction would become large. In this case, it is difficult for the worker to access the first placement section 111ba and the second placement section 211ba.

Figure 6:
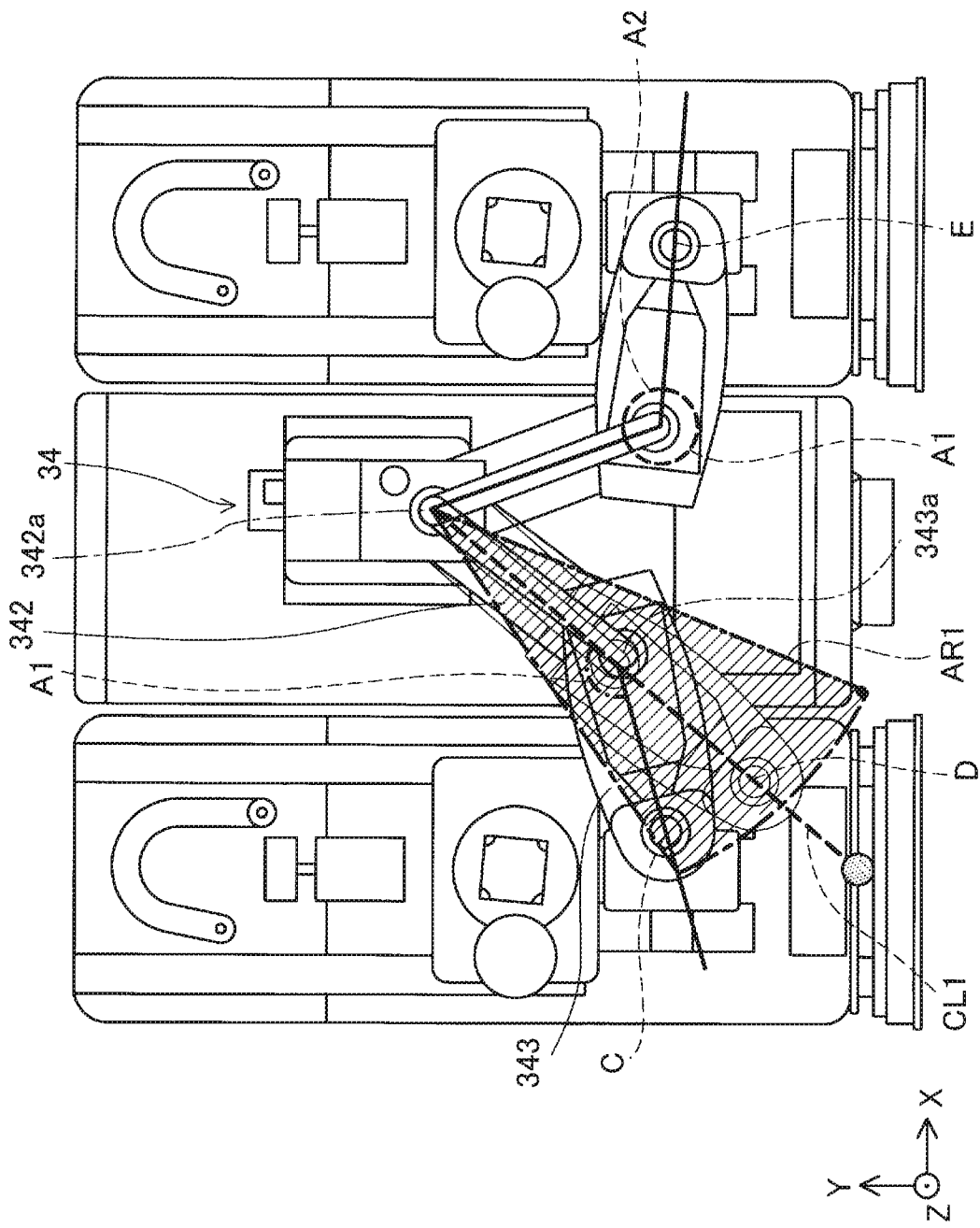
FIG. 6 is a diagram for explaining the movement of a first robot.

FIG. 6 is a diagram for explaining the movement of the first robot 34. In the present embodiment, by the first arm 342 and the second arm 343 being aligned on the co-linear straight line CL1, in the first angular range AR1, an angle formed by the first arm 342 and the second arm 343 centered on the second joint 343a changes from less than 180° to 180° or more, or from 180° or more to less than 180°. In FIG. 6, the reference symbol indicating point where the second arm 343 is positioned is attached to the vicinity of the tip end 343b of the second arm 343. The same applies to FIG. 7 (to be described later). As shown in FIG. 6, when the second arm 343 is positioned at point C, the first angle A1, which is the angle centered on the second joint 343a and formed by the first arm 342 and the second arm 343 and is an angle on the first injection molding section 11 side with respect to the second injection molding section 21, is smaller than 180°. An angle centered on the second joint 343a and formed by the first arm 342 and the second arm 343 refers to an angle centered on the first joint 342a and formed by a straight line parallel to the plane including the Y-axis and the X-axis passing through the first arm 342 and a straight line parallel to the plane including the Y-axis and the X-axis passing through the second arm 343.

When the second arm 343 is positioned at point D, the first arm 342 and the second arm 343 can be aligned on the co-linear straight line in the first angular range AR1. By rotating the second joint 343a counterclockwise while the second arm 343 is located at point D, the first angle A1 can be made larger than 180°. By rotating the second joint 343a is rotated counterclockwise while the second arm 343 is located at point D, the first angle A1 can be made larger than 180°. When the second arm 343 is positioned at a point E, the first angle A1 is larger than 180°.

In the injection molding system 1 of the present embodiment, since the first robot 34 is disposed between the first injection molding section 11 and the second injection molding section 21, the footprint of the injection molding system 1 as viewed in the vertical direction can be reduced as compared with an aspect in which the first injection molding section 11 and the second injection molding section 21 are disposed aligned and the first robot 34 is disposed so as to face the first injection molding section 11 and the second injection molding section 21 disposed aligned. Further, the footprint of the injection molding system 1 as viewed in the vertical direction can be reduced as compared with the aspect in which the first injection molding section 11, the second injection molding section 21, and the first robot 34 disposed aligned are arranged to be separated from each other so as to avoid interference.

In addition, since the first arm 342 and the second arm 343 can be aligned on the co-linear straight line in the first angular range AR1, both a posture in which the angle formed by the first arm 342 and the second arm 343 is less than 180° and a posture in which the angle formed by the first arm 342 and the second arm 343 is greater than 180° can be taken by rotating the second arm 343 with respect to the first arm 342 at a position at which the first arm 342 and the second arm 343 are aligned. As a result, the first robot 34 can carry the workpiece WK from the first injection molding section 11 to the second injection molding section 21 while avoiding interference with the third wall section 33, which is a component constituting the injection molding system 1.

Figure 7:
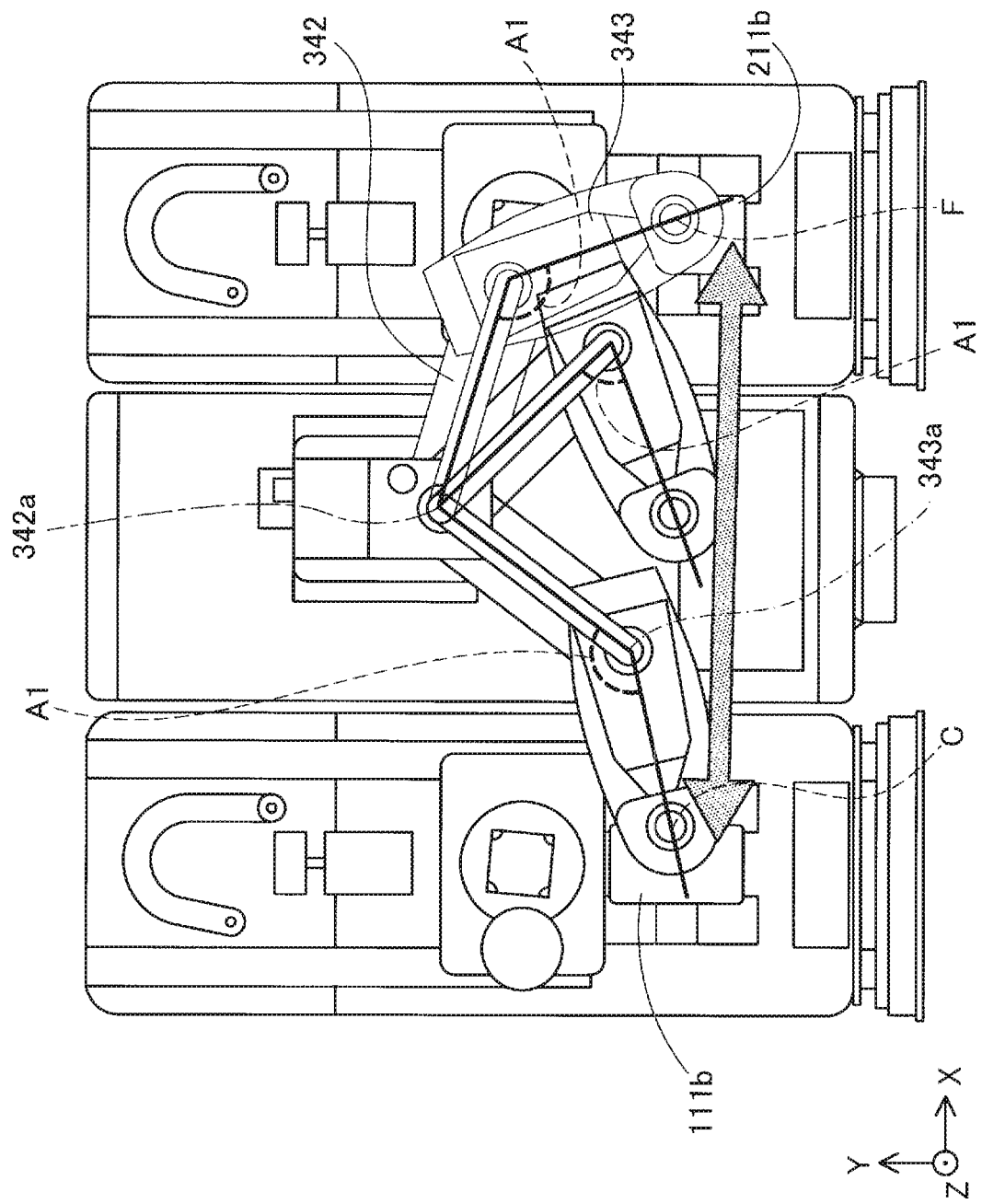
FIG. 7 is a diagram for explaining an injection molding system of a comparative example.

FIG. 7 is a diagram for explaining the injection molding system of a comparative example. As shown in FIG. 1, in the present embodiment, as viewed in the vertical direction, the second material storage section 210a is positioned on the same side as the first placement section 111ba and the second placement section 211ba with respect to the first joint 342a. Therefore, in the aspect in which the first arm 342 and the second arm 343 are not aligned on a co-linear straight line, there is a possibility that the first robot 34 moves, as indicated by the double-headed arrow in FIG. 7, between the first placement section 111ba and the second placement section 211ba from point C in a posture in which the first angle A1 is less than 180°. In order for the first holding section 345 to access the second lower molding die 211b in this posture, the second arm 343 needs to move to point F in FIG. 7, but there is a possibility that the second arm 343 is in contact with the second material storage section 210a. Conversely, even in a case where the first robot 34 takes a posture in which the first angle A1 is equal to or greater than 180° in a portion overlapping the first injection unit 110 as viewed in the vertical direction, the first injection unit 110 and the second arm 343 may interfere with each other.

In the present embodiment, by the first arm 342 and the second arm 343 being aligned in the first angular range AR1, both a posture in which the angle formed by the first arm 342 and the second arm 343 is less than 180° and a posture in which the angle formed by the first arm 342 and the second arm 343 is greater than 180° can be taken. As a result, as represented by the first robot 34 positioned at point C in FIG. 6, the workpiece WK can be carried in a state where the first angle A1 is smaller than 180°. As represented by the first robot 34 positioned at point E in FIG. 6, the workpiece WK can be carried in a state where the second angle A2, which is the angle between the first arm 342 and the second arm 343 centered on the second joint 343a, and which is the angle on the second injection molding section 21 side with respect to the first injection molding section 11, is smaller than 180°. In this way, the workpiece WK is carried while the second arm 343 and the second material storage section 210a, which is a component of the injection molding system 1, are prevented from contacting each other when the workpiece WK is carried.

The first robot control section 346 shown in FIG. 2 is configured by a computer similar to that of the first injection control section 115. The first robot control section 346 controls the operations of the first arm 342, the second arm 343, and the first holding section 345 and causes the first robot 34 to exhibit various functions by the processor executing a program or an instruction read on the main storage device. In the present embodiment, the first robot 34 is controlled by the first injection control section 115 of the first injection molding section 11 and the second injection control section 215 of the second injection molding section 21 via the first robot control section 346. The first robot control section 346 includes a power supply board 346a.

The power supply board 346a converts power supplied from an external AC power supply into DC power and supplies the converted power to the processor and the main storage device. The power supply board 346a has a circuit that steps down the power supplied from the external AC power source and converts the stepped down power to the DC power. In the present embodiment, the power supply board 346a is disposed on the +Z side of the first placement section 111ba and the second placement section 211ba.

In general, it is known that a device for molding the molded article by injecting the material, such as the first injection molding section 11 and the second injection molding section 21, generates high heat during operation. According to the injection molding system 1 of this aspect, by the power supply board 346a being positioned vertically above the first placement section 111ba of the first lower molding die 111b and the second placement section 211ba of the second lower molding die 211b, the power supply board 346a is separated from the first lower molding die 111b and the second lower molding die 211b. Therefore, compared to an aspect in which the power supply board 346a is positioned at the same height as that of the first lower molding die 111b and the second lower molding die 211b, it is possible to reduce the possibility that the power supply board 346a is damaged or deteriorated due to heat generated when the first injection molding section 11 and the second injection molding section 21 operate.

The second robot 44 is disposed on the fourth housing 40. The fourth housing 40 has a configuration similar to that of the third housing 30. Detailed description of the same configuration of the fourth housing 40 as that of the third housing 30 will be omitted. The fourth housing 40 includes a second mounting section 41, a second pedestal 42, and a fourth wall section 43 (not shown). The fourth housing 40 has the same dimensions in the X-axis, the Y-axis, and the Z-axis as the first housing 10, the second housing 20, and the third housing 30. Accordingly, for example, compared to an aspect in which the dimensions of the first housing 10, the second housing 20, the third housing 30, and the fourth housing 40 are different from each other, there is a sense of unity as the entire injection molding system, and it is possible to feel beauty in design in the side view of the injection molding system 1.

The second robot 44 carries the molded article from the second injection molding section 21 to the transport device 50. The second robot 44 has a configuration similar to that of the first robot 34. Detailed description of the same configuration of the second robot 44 as that of the first robot 34 will be omitted. Similarly to the first robot 34, the second robot 44 is constituted by the horizontal articulated robot. The second robot 44 includes a second base 441, a first arm 442, a second arm 443, a second shaft 444, a second holding section 445, and a second robot control section 446.

In the present embodiment, as shown in FIG. 1, in the second robot 44, the first arm 442 and the second arm 443 can be aligned on the co-linear straight line in a third angular range AR3, which is an angular range centered on the first joint 442a of the second robot 44 and between the second placement section 211ba and the end portion of the fourth wall section 43 closest to the −Y side. In FIG. 1, the third angular range AR3 is hatched. Thus, the second arm 443 can access the transport device 50 in a state where the angle between the first arm 442 and the second arm 443 around the second joint 443a of the second robot 44 as the center is less than 180°. The second robot 44 is taught in advance by the teaching device (not shown) so as to be able to perform the same movement as the first robot 34.

The transport device 50 transports the molded article carried by the second robot 44 out of the injection molding system 1. In FIG. 1, the transport device 50 is simplified. The transport device 50 is disposed on the second mounting section 41 of the fourth housing 40. As shown in FIG. 1, in the present embodiment, as viewed in the vertical direction, the transport device 50, the first placement section 111ba, and the second placement section 211ba are disposed on the co-linear straight line SL1 in the X-axis direction. In the present embodiment, the portion of the transport device 50 where the molded article is placed, the first placement section 111ba, and the second placement section 211ba are all disposed on the co-linear straight line SL1 in the X-axis direction. Thus, when the first robot 34 carries the workpiece WK from the first placement section 111ba to the second placement section 211ba, the second robot 44 can carry the workpiece WK with a small number of operations as compared with an aspect in which the first placement section 111ba, the second placement section 211ba, and the transport device 50 are not disposed on the co-linear straight line SL1, for example, by coupling the transport device 50 to the second pedestal 42 of the fourth housing 40. In the present embodiment, the transport device 50 is a belt conveyor.

A2. Method for Controlling the Injection Molding System 1

Figure 8:
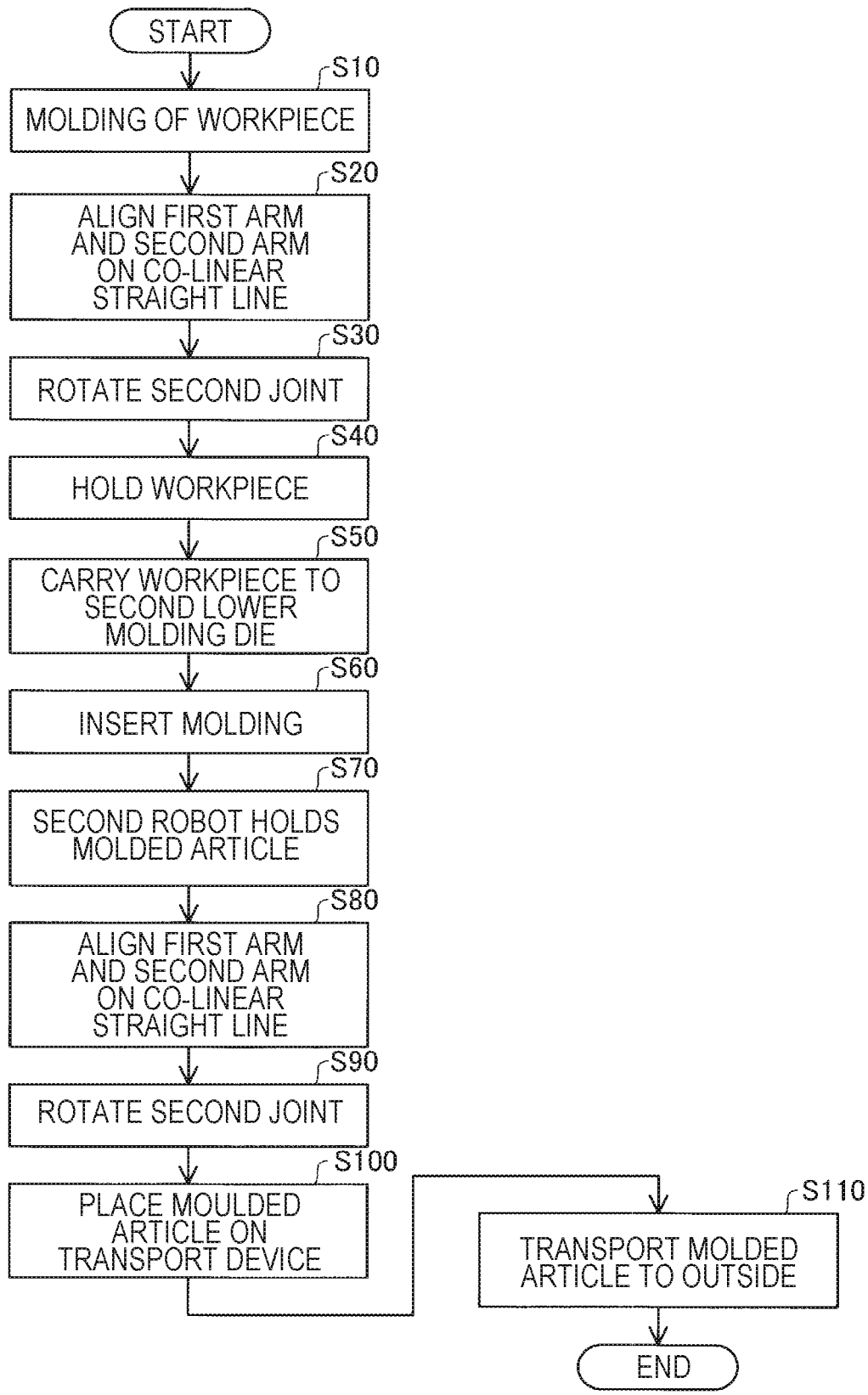
FIG. 8 is a process diagram for explaining a method for carrying a workpiece.

FIG. 8 is a process diagram for explaining the method of carrying the workpiece WK. Carry of the workpiece WK by the first robot 34 is executed by the first robot 34 controlled by the first injection control section 115 and the second injection control section 215. In step S10 of FIG. 8, the workpiece WK is molded by the first injection molding section 11. The first lower molding die 111b is moved to point B shown in FIG. 3 by the movement of the first position changing section 113. The molded workpiece WK is placed on the first placement section 111ba.

In step S20 of FIG. 8, the first robot 34 aligns the first arm 342 and the second arm 343 on a co-linear straight line in the first angular range AR1 at point D of FIG. 6. In step S30 of FIG. 8, the first robot 34 rotates the second joint 343a clockwise to take a posture in which the first angle A1 is from 180° or more to less than 180°. In step S40, as shown at point C in FIG. 6, the first holding section 345 holds the workpiece WK of the first injection molding section 11 in a state where the first angle A1 is less than 180°. Then, at point D, the first robot 34 rotates the second joint 343a counter-clockwise and takes a posture in which the first angle A1 is 180° or more.

In step S50, as represented by point E in FIG. 6, the workpiece WK is carried by the first robot 34 to the second placement section 211ba of the second injection molding section 21 in a state where the first angle A1 is 180° or more, that is, a state where the second angle A2 is less than 180°. In step S60 of FIG. 8, insert molding is performed using the workpiece WK by the second injection molding section 21 to mold the molded article.

In step S70, the second robot 44 holds the molded article. In step S80, the second robot 44 aligns the first arm 342 and the second arm 343 on the co-linear straight line in the third angular range AR3 shown in FIG. 1. In step S90, the second robot 44 rotates the second joint 443a such that the angle between the first arm 442 and the second arm 443 around the second joint 443a as the center is from less than 180° to 180° or more. In step S100, the second robot 44 places the molded article on the transport device 50. In step S110, the molded article is transported out of the injection molding system 1 by the transport device 50. Thereafter, the process ends.

B. Other Embodiments

B1. Other Embodiment 1

(1) In the above described embodiment, the first robot 34 is disposed at a position where the distance between the first joint 342a and the first placement section 111ba is larger than the distance between the first joint 342a and the second placement section 211ba, and the first arm 342 and the second arm 343 can be aligned on the co-linear straight line in the angular range from the first placement section 111ba to the third wall section 33, centered on the first joint 342a. For example, in an aspect in which the material storage section of the second injection molding section is positioned on the +Y side with respect to the second placement section, the first robot may be disposed at a position where the distance between the first joint and the second placement section is larger than the distance to the first placement section, and the first arm and the second arm may be aligned on the co-linear straight line in an angular range from the second placement section to the third wall section, centered on the first joint.

In this aspect, similarly to the above described embodiment, the first robot can carry the workpiece from the first injection molding section to the second injection molding section while avoiding interference with components constituting the injection molding system.

(2) For example, in an aspect in which the workpiece molded by the first injection molding section is moved from the first lower molding die shown at point A to a component different from the first lower molding die, and the component is held by the first robot at point B, the component may be considered to be the first placement section. Similarly, for example, in an aspect in which the workpiece carried by the first robot is placed on a component different from the second lower molding die by the first robot and is moved to the component different from the second lower molding die, the component may be considered to be the second placement section. In this aspect, the robot is disposed at a position where a distance between the first joint and one of the first placement section and the second placement sections is larger than a distance to the other, and the first arm and the second arm can be aligned on the co-linear straight line in an angular range from one to the wall section centered on the first joint.

(3) In the above described embodiment, the center of the portion of the first lower molding die 111b where the workpiece WK is placed is referred to as the "first placement section 111ba". The first placement section may be a portion other than the center of the portion of the first lower molding die on which the workpiece WK is placed.

(4) In the above described embodiment, the center of the portion of the second lower molding die 211b where the workpiece WK is placed by the first robot 34 is referred to as the "second placement section 211ba". The second placement section may be a portion other than the center of the portion of the second lower molding die on which the workpiece is placed by the first robot.

(5) In the above described embodiment, the injection molding system 1 includes the first housing 10, the second housing 20, the third housing 30, the fourth housing 40, and the transport device 50. For example, the injection molding system may include only the first injection molding section, the second injection molding section, and a robot. In addition, the injection molding system may include a third injection molding section having the same configuration as the first injection molding section or the second injection molding section, and a third robot having the same configuration as the first robot.

(6) In the above described embodiment, the adjacent housings are attachably and detachably connected to each other. The adjacent housings may be configured so as not to be attachable and detachable from each other.

(7) In the above described embodiment, the first housing 10 includes the first wall section 13, and the second housing 20 includes the second wall section 23. The first housing may not include the first wall section, and the second housing may not include the second wall section.

(8) In the above described embodiment, the first injection control section 115 and the second injection control section 215 are electrically connected to each other to control the first robot control section 346 and the second robot control section 446. Note that, for example, the injection molding system may include a control section that integrally controls the injection control section of the first injection molding section, the injection control section of the second injection molding section, the robot control section of the first robot, and the robot control section of the second robot.

(9) In the above described embodiment, the first robot 34 includes the first robot control section 346, and is controlled by the first injection control section 115 via the first robot control section 346. The first robot may not include the robot control section. In this aspect, for example, the first robot may be controlled by the injection control section.

(10) In the above described embodiment, the second robot 44 is taught in advance by the teaching device (not shown) to enable it to perform the same movement as the first robot 34, so that the second robot 44 can perform the same movement as the first robot 34. Note that the second robot may not perform the same movement as the first robot.

(11) In the above described embodiment, the second injection molding section 21 molds the molded article by insert molding using the workpiece WK. For example, the injection molding system may mold the molded article by two color molding.

B2. Other Embodiment 2

(1) For example, in an aspect in which the material storage section of the first injection molding section is positioned on the +X direction side with respect to the first placement section and the material storage section of the second injection molding section is positioned on the +X direction side with respect to the second placement section, the first joint may be disposed at a position where the distance to the second placement section is larger than the distance to the first placement section.

(2) In the above described embodiment, the first material storage section 110a has the same height as the second arm 343 as viewed in the horizontal direction, and is positioned on the same side as the first placement section 111ba with respect to the first joint 342a. For example, the material storage section of the first injection molding section may be an aspect that has a height different from that of the second arm as viewed in the horizontal direction, or may be positioned on the opposite side from the first placement section with respect to the first joint.

B3. Other Embodiment 3

In the above embodiment, the second material storage section 210a has the same height as the second arm 343 as viewed in the horizontal direction, and is positioned on the same side as the second placement section 211ba with respect to the first joint 342a. For example, the material storage section of the second injection molding section may be an aspect to have a height different from that of the second arm as viewed in the horizontal direction, or may be positioned on the opposite side from the second placement section with respect to the first joint.

B4. Other Embodiment 4

In the above described embodiment, the first base 341 is positioned above the first injection base 12 and the second injection base 22 in the vertical direction. For example, in an aspect in which the dimension of the first robot in the vertical direction is larger than or equal to the dimension of the configuration of the first injection molding section disposed on the upper side of the first injection base in the vertical direction and the dimension of the configuration of the second injection molding section disposed on the upper side of the second injection base, the base may not be positioned on the upper side of the first injection base and the second injection base in the vertical direction. In this aspect, the injection molding system may be provided with no pedestal, and the lowermost end portion of the base in the vertical direction may be aligned with the first injection base and the second injection base in the same horizontal direction as viewed in the horizontal direction.

B5. Other Embodiment 5

In the above described embodiment, the first robot 34 includes the first shaft 344. For example, in an aspect in which the workpiece can be held by the holding section coupled to the second arm, the robot may not include the shaft.

B6. Other Embodiment 6

In the above described embodiment, the power supply board 346a is disposed above the first placement section 111ba and the second placement section 211ba in the vertical direction. For example, the power supply board may be an aspect to have aligned with the first placement section and the second placement section in the horizontal direction.

B7. Other Embodiment 7

(1) In the above described embodiment, the injection molding system 1 includes the fourth housing 40 and the transport device 50. For example, in an aspect in which the operator takes out the molded article, the injection molding system may not include the fourth housing and the transporting device.

(2) In the above described embodiment, the transport device 50, the first placement section 111ba, and the second placement section 211ba are all disposed on the co-linear straight line SL1 in the direction in which the first injection molding section 11, the first robot 34, and the second injection molding section 21 are aligned. The transport device, the first placement section, and the second placement section may not be disposed on the co-linear straight line in the direction in which the first injection molding section, the first robot, and the second injection molding section are aligned.

B8. Other Embodiment 8

For example, the workpiece may be transported in an aspect in which the first robot is disposed at a position where the distance between the first joint and the second placement section is larger than the distance to the first placement section, and the first arm and the second arm can be aligned on the co-linear straight line in the angular range from the second placement section to the third wall section centered on the first joint.

C. Other Forms

The present disclosure is not limited to the embodiments described above, and can be realized in various forms without departing from the scope of the present disclosure. For example, the present disclosure can also be realized by the following forms. The technical features in the above-described embodiments corresponding to the technical features in each form described below can be appropriately replaced or combined in order to solve a part or all of the problems of the present disclosure or to achieve a part or all of the effects of the present disclosure. In addition, if the technical features are not described as essential in this specification, the technical features can be appropriately deleted.

(1) According to one aspect of the present disclosure, an injection molding system is provided.

This injection molding system includes a first injection molding section configured to mold a workpiece; a second injection molding section that is disposed aligned in a horizontal direction with the first injection molding section and that is configured to mold a molded article by using the workpiece; a robot that is disposed between the first injection molding section and the second injection molding section and that is configured to carry the workpiece from the first injection molding section to the second injection molding section; and a wall section disposed between the first injection molding section and the second injection molding section and extending in the direction in which the first injection molding section and the second injection molding section are aligned, wherein the first injection molding section includes a first placement section on which the workpiece is placed, the second injection molding section includes a second placement section on which the workpiece used for molding is placed, the robot includes a base, a first arm coupled to the base via a first joint, and a second arm coupled to the base via a second joint with a rotation axis parallel to a rotation axis of the first joint, the injection molding system, as viewed in a vertical direction, a first distance, which is the distance between the first joint and the first placement section, a second distance, which is the distance between the first joint and the second placement section, and a third distance, which is the distance between the first joint and the wall section, are smaller than a fourth distance, which is the distance between the first joint and a tip end of the second arm when the first arm and the second arm are on a co-linear straight line, and the robot is disposed at a position where the distance between the first joint and either the first placement section or the second placement section is larger than the distance between the other and in the robot, centered on the first joint, in an angular range from the one side to the wall section, the first arm and the second arm are can be aligned on the co-linear straight line.

According to this injection molding system of this aspect, it is possible to reduce the footprint of the injection molding system as viewed in the vertical direction, compared to an aspect in which the first injection molding section, the second injection molding section, and the first robot are disposed to be separated from each other. In addition, since the first arm and the second arm can be aligned on the co-linear straight line in the angular range from one side to the wall section around the first joint as the center, both a posture in which the angle formed by the first arm and the second arm is less than 180° and a posture in which the angle formed by the first arm and the second arm is greater than 180° can be taken by rotating the second arm with respect to the first arm at a position at which the first arm and the second arm are aligned. As a result, the robot can carry the workpiece from the first injection molding section to the second injection molding section while avoiding interference with the components constituting the injection molding system.

(2) The injection molding system according above aspect may be such that in the robot, in the angular range from the one side to the wall section centered on the first joint, the angle formed by the first arm and the second arm with the second joint as a center is from less than 180° to 180° or more or from 180° or more to less than 180°.

(3) The injection molding system according above aspect may be such that the first injection molding section includes a component that has the same height as the second arm as viewed in the horizontal direction and that is positioned on the same side as the first placement section with respect to the first joint and the first joint is disposed at a position where the distance to the second placement section is larger than the distance to the first placement section.

According to this aspect of the injection molding system, it is possible to prevent the component from in contact with the robot.

(4) The injection molding system according above aspect may be such that the second injection molding section includes a component that has the same height as the second arm as viewed in the horizontal direction and that is positioned on the same side as the second placement section with respect to the first joint and
the first joint is disposed at a position where the distance to the first placement section is larger than the distance to the second placement section.

According to this aspect of the injection molding system, it is possible to prevent the component from in contact with the robot.

(5) The injection molding system according above aspect may be such that the first placement section is disposed above a first injection base in the vertical direction, the second placement section is disposed above a second injection base in the vertical direction, and the base is positioned above the first injection base and the second injection base in the vertical direction.

(6) The injection molding system according above aspect may be such that the robot further includes a shaft that is coupled to the second arm and that is extending vertically downward from the second arm and a holding section that is coupled to the shaft and that is configured to hold the workpiece.

(7) The injection molding system according above aspect may be such that the robot includes a power supply board to which electric power is supplied from the outside and the power supply board is disposed above the first placement section and the second placement section in the vertical direction.

(8) The injection molding system according above aspect may further include a second robot configured to carry the molded article from the second injection molding section and a transport device configured to transport the molded article carried by the second robot, wherein as viewed in the vertical direction, each of the transport device, the first placement section, and the second placement section are arranged on the co-linear straight line in the direction in which the first injection molding section, the robot, and the second injection molding section are aligned.

According to another aspect of the present disclosure, a method for controlling an injection molding system is provided.

This control method for the injection molding system includes a first injection molding section injection-molding a workpiece; a robot including a first arm coupled to a base via a first joint and a second arm coupled to the base via a second joint having a rotation axis parallel to a rotation axis of the first joint as viewed in a vertical direction, centered on the first joint, in an angular range from either the first placement section of the first injection molding section and a second placement section to which the workpiece is transported, which has a larger distance from the robot, to a wall section, which is disposed between the first injection molding section and a second injection molding section, which performs molding using the workpiece and extends in the direction in which the first injection molding section and the second injection molding section are aligned, aligns the first arm and the second arm on the co-linear straight line, holds the workpiece placed in the first placement section in a state in which an angle formed by the first arm and the second arm with the second joint as a center, which is an angle on the first injection molding section side with respect to the second injection molding section, is less than 180°, and transporting the workpiece to the second injection molding section in a state in which the angle is 180° or more; and the second injection molding section molding a molded article using the workpiece.

What is claimed is:

1. An injection molding system comprising:
   a first injection molding section that has a wall section and that is configured to mold a workpiece;
   a second injection molding section that has a wall section, that is disposed aligned in a horizontal direction with the first injection molding section, and that is configured to mold a molded article by using the workpiece;
   a robot that is disposed between the first injection molding section and the second injection molding section and that is configured to carry the workpiece from the first injection molding section to the second injection molding section; and
   a robot wall section disposed between the first injection molding section and the second injection molding section and extending in the direction in which the first injection molding section and the second injection molding section are aligned, wherein
   the first injection molding section includes a first placement section on which the workpiece is placed,
   the second injection molding section includes a second placement section on which the workpiece used for molding is placed,
   the robot includes
     a base,
     a first arm coupled to the base via a first joint, and
     a second arm coupled to the base via a second joint with a rotation axis parallel to a rotation axis of the first joint,
   as viewed in a vertical direction,
     a first distance, which is the distance between the first joint and the first placement section, a second distance, which is the distance between the first joint and the second placement section, and a third distance, which is the distance between the first joint and the robot wall section, are smaller than a fourth distance, which is the distance between the first joint and a tip end of the second arm when the first arm and the second arm are on a co-linear straight line, and
     in an angular range centered on the first joint from one of the first placement section and the second placement section to the robot wall section, the distance between the first joint and at least a part of the wall section is larger than the fourth distance.

2. The injection molding system according to claim 1, wherein
   in the robot, in the angular range, the angle formed by the first arm and the second arm is changeable from less than 180° to 180° or more or from 180° or more to less than 180°.

3. The injection molding system according to claim 1, wherein
   the first injection molding section includes a component that has the same height as the second arm as viewed in the horizontal direction and that is positioned on the same side as the first placement section with respect to the first joint and
   the distance between the first joint and the second placement section is larger than the distance between the first joint and the first placement section.

4. The injection molding system according to claim 1, wherein
   the second injection molding section includes a component that has the same height as the second arm as viewed in the horizontal direction and that is positioned on the same side as the second placement section with respect to the first joint and
   the distance between the first joint and the first placement section is larger than the distance between the first joint and the second placement section.

5. The injection molding system according to claim 1, wherein
   the first placement section is disposed above a first injection base in the vertical direction,
   the second placement section is disposed above a second injection base in the vertical direction, and
   the base is positioned above the first injection base and the second injection base in the vertical direction.

6. The injection molding system according to claim 5, wherein
   the robot further includes
     a shaft that is coupled to the second arm and that is extending vertically downward from the second arm and
     a holding section that is coupled to the shaft and that is configured to hold the workpiece.

7. The injection molding system according to claim 1, wherein
   the robot includes a power supply board to which electric power is supplied from the outside and
   the power supply board is disposed above the first placement section and the second placement section in the vertical direction.

8. The injection molding system according to claim 1, further comprising:
   a second robot configured to carry the molded article from the second injection molding section and
   a transport device configured to transport the molded article carried by the second robot, wherein
   as viewed in the vertical direction, the transport device, the first placement section, and the second placement section are disposed on a co-linear straight line.

* * * * *